Jan. 3, 1950　　T. M. GLUYAS, JR　　2,493,066
MICROWAVE DETECTOR NETWORK
Filed July 24, 1945
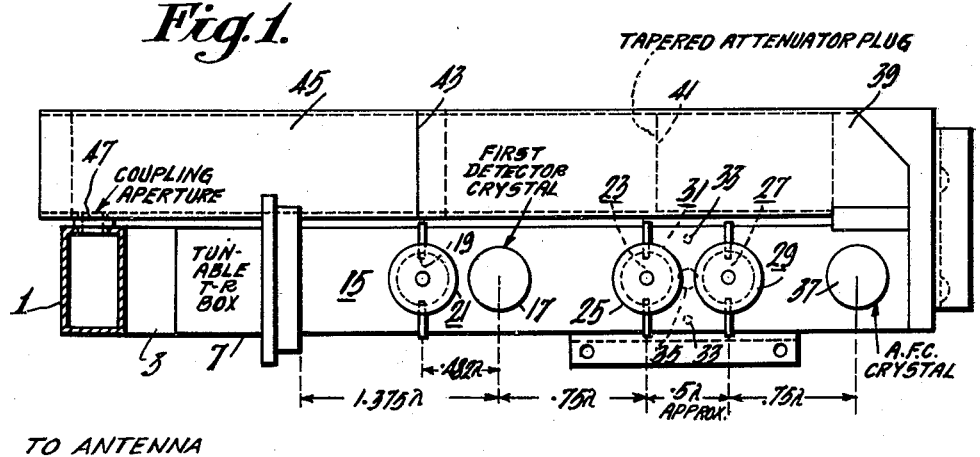
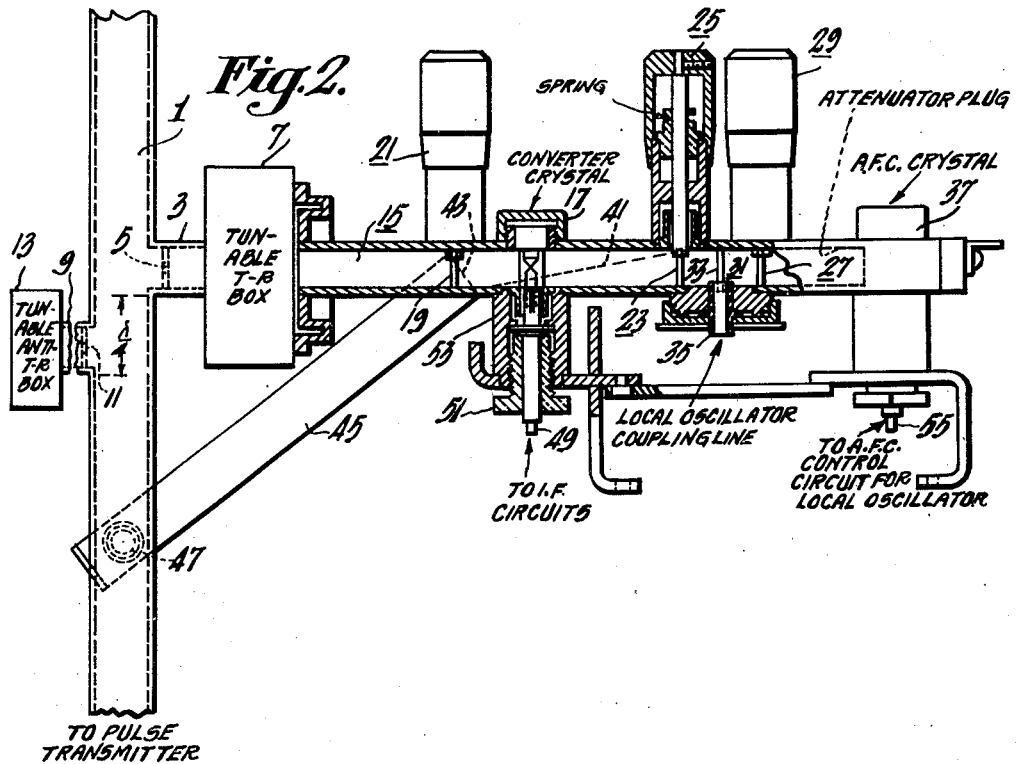
INVENTOR.
Thomas M. Gluyas, Jr.
BY
ATTORNEY Patented Jan. 3, 1950

2,493,066

UNITED STATES PATENT OFFICE 2,493,066

MICROWAVE DETECTOR NETWORK

Thomas M. Gluyas, Jr., Westmont, N. J., assignor to Radio Corporation of America, a corporation of Delaware Application July 24, 1945, Serial No. 606,806

14 Claims. (Cl. 250—20)

This invention relates generally to microwave communication systems and more particularly to an improved microwave detector network for superheterodyne receivers including automatic-frequency-control circuits.

Efficient centimeter wave receivers have been developed utilizing crystal detectors of the silicon-tungsten or other known types coupled to an input waveguide system which is connected to a microwave antenna. The received signals are modulated by a source of local oscillations to provide an intermediate frequency signal, and the received signals and local oscillations also are applied to a second crystal to derive potentials for automatic frequency control of the receiver oscillator tuning. The instant invention is an improvement upon such microwave superheterodyne converter and automatic-frequency-control circuits for a microwave transmitter-receiver system for radar or other pulse transmission purposes.

The instant system includes a pulse transmitter, such as a magnetron, coupled through a transmission waveguide to a common transmitting and receiving antenna. Branch waveguides connected to the main transmission waveguide include ionic discharge type cavity resonator T-R and anti-T-R boxes (selective transmit-receive switching devices). Such T-R boxes are well known in such systems and permit alternate isolation of the transmitter and the receiver from the antenna system in response to the transmitted microwave energy. When the transmitter is inoperative (for example, during the time intervals between transmitted pulses), the T-R box permits received signals to be applied to the signal detector and the anti-T-R box isolates the transmitter and its connecting waveguide from the antenna system. The T-R boxes may comprise adjustably tuned cavity resonators having an ionizable gap disposed to break down when an intense field is established within the resonator due to transmitted pulses. The ionizable gap interrupts microwave transmission through a waveguide system coupled through, or to, the T-R box, or may be employed to change the tuning of a waveguide system connected thereto.

The novel features of the instant invention comprise a unique arrangement of the elements comprising the T-R box, receiver first detector, local oscillator injection network, and automatic frequency control detector. Previous systems have had the disadvantage that objectionable reaction occurred between the first signal detector and the automatic-frequency-control detector and that objectionable loading of either detector or the local oscillator was provided by the adjacent T-R box or automatic-frequency-control signal input circuit. Previous systems have had another disadvantage that the local oscillator placed objectionable loading on the signal detector with consequent loss of signal energy and deterioration of signal-to-noise ratio.

The present system includes a signal detector-automatic frequency control crystal network comprising a waveguide coupled through the tunable T-R box to the antenna-transmitter waveguide system. The signal detector comprises a crystal matched with respect to impedance to the detector waveguide, and spaced one and three-eighths wavelengths from the tunable T-R box. A tunable aperture is disposed at a distance of .482 wavelength from the signal crystal, intermediate the crystal and the T-R box, whereby the tunable T-R box and the tunable aperture comprise a double stub tuner which will match with respect to impedance all conventional types of microwave crystal detectors.

The automatic-frequency-control crystal is spaced a distance of approximately two wavelengths further along the detector waveguide, and the local oscillator signal is injected into a non-resonant cavity disposed substantially midway between the two detectors. The non-resonant cavity is formed by two tuned aperture devices located about one-half wavelength apart and including two conductive stubs extending transversely therein in planes parallel to the electric field. The oscillator frequency is selected to be higher than the received signal frequency by an amount equal to the desired intermediate frequency.

Since the T-R box is tuned to a lower frequency than the local oscillator frequency, it is reactive, and tunes the one and three-eighths wavelengths line between it and the signal detector to provide a high impedance across the signal crystal at the oscillator frequency. This arrangement prevents loading of the oscillator output energy by the T-R box as well as minimizing undesirable shifting or pulling of the oscillator frequency, and allows the oscillator to be tuned thru a range of frequencies without changing the coupling to the signal detector, an essential feature in sets employing A. F. C. This arrangement is especially desirable since it is essential that the signal detector must not be shunted by excessive conductance or susceptance reflected from the T-R box cavity. The tuning of the two tuned aperture devices forming the boundaries of the non-resonant cavity into which the local oscillations are injected provides the desired degree of coupling to the signal detector and to the automatic-frequency-control detector. These apertures are normally considerably removed from resonance and are low impedance circuits across the guide at signal frequency. They are located an odd number of quarter wavelengths from the detector and therefore reflect a high impedance across the detector so that signal energy is not lost by passing on to the local oscillator cavity or through to the A. F. C. detector.

The local oscillator may comprise, for example, a conventional tunable microwave tube comprising a tunable cavity resonator having an electron source and an electron reflector electrode. The output of the local oscillator may be coupled into the non-resonant local oscillator injection cavity through a conventional microwave transmission line or signal radiating stub inserted within the non-resonant cavity.

Sampling of the transmitted microwave energy for the automatic-frequency-control detector circuit is accomplished by means of a small aperture in the narrow side of the transmission waveguide opening into a sampling waveguide disposed at an angle thereto in order to obtain a transverse electric field component in the sampling waveguide. The angularly disposed sampling waveguide is coupled to a second sampling waveguide section which includes a tapered absorptive insulating plug providing sufficient microwave attenuation to prevent resonance in the sampling waveguide line. This avoids selective frequency loading of the A. F. C. detector and consequent "pulling of the local oscillator frequency." The energy derived after transmission through the tapered insulating attenuator plug is applied to the remaining end of the detector waveguide for actuating the automatic-frequency-control detector.

Thus, the received signals and the automatic-frequency-control sampling signals are applied to the two detectors from opposite ends of the detector waveguide system. Also the local oscillations are applied separately to the two detectors in opposite directions from the center of the detector waveguide system, whereby substantially no reaction occurs between the two detector circuits and minimum loading of the local oscillator is encountered. The desired attenuation of the transmitted signal pulses for the purpose of actuating the automatic-frequency-control detector is provided by proper selection of the coupling aperture between the sampling waveguide and transmission waveguide.

Among the objects of the invention are to provide an improved method of and means for receiving microwave signals. Another object is to provide an improved microwave superheterodyne detector network having automatic-frequency-control circuits associated therewith. An additional object is to provide an improved microwave pulse transmitter-receiver system having selective connections from a pulse transmitter and pulse receiver to a common antenna system and including means for isolating a source of local oscillations from input circuits having normally serious loading characteristics. A further object of the invention is to provide an improved method of and means for selectively injecting local oscillations in a microwave superheterodyne receiver to the signal detector and to an automatic frequency control detector.

An additional object is to provide improved methods of and means for preventing overloading and frequency pulling of a local oscillator in a microwave superheterodyne detector network. Another object is to provide an improved method of and means for isolating a signal detector and an automatic-frequency-control detector coupled to a common local oscillator source in a microwave superheterodyne receiver network. A further object of the invention is to provide an improved microwave superheterodyne detector circuit including a transmit-receive switching device wherein the transmit-receive switching device comprises a portion of the signal detector frequency selection circuit. A still further object is to provide an improved method of and means for suppressing resonance conditions in a normally resonant waveguide system for the detection of microwave signals.

These and other objects of the invention will be apparent from the more detailed description of the novel system and method illustrated in the accompanying drawing of which Figure 1 is a plan view of a preferred embodiment thereof and Figure 2 is an elevational view, partly in cross-section, of said preferred embodiment of the invention. Similar reference characters are applied to similar elements throughout the drawing.

Referring to the drawing, a main transmission waveguide 1 is connected between a microwave pulse transmitter, such as a magnetron not shown, and an antenna, not shown. A receiver waveguide 3, including a fixed aperture device 5, branches off from the transmitter waveguide 1 and enters a tunable T-R box 7. At a point spaced one-quarter wavelength in the direction of the transmitter, a second waveguide 9 branches from the main transmission waveguide 1. The second waveguide 9 includes a second aperture device 11 and is terminated in a tunable anti-T-R box 13 of the same general type as the T-R box 7, although it should have a single waveguide connection as in the type 724A unit. Both T-R boxes may comprise gas-filled cavity resonators having a narrow central gap which breaks down in an ionic discharge when the field intensity within the cavity resonator exceeds predetermined values.

Both T-R boxes discharge when a transmitter pulse is propagated along the transmitter waveguide 1 to the antenna. When the T-R box 7 is ionized it effectively prevents transmitted pulses from entering the receiver waveguide 3. In the intervals between transmitted pulse energy, the ionic discharges in the T-R boxes 7 and 13 cease and received pulses from the antenna may pass through the receiver T-R box 7 to the detector waveguide 15 which opens into the T-R box. When no ionic discharge occurs in the anti-T-R box 13, the pulse transmitter is effectively isolated from the receiver waveguide and antenna waveguide systems, since the transmitter waveguide 1 is thus effectively short-circuited at the junction thereof with the receiver waveguide 3.

At a distance along the receiver waveguide 15 spaced 1.375 wavelengths at the operating frequency from the tunable T-R box 7 is located a conventional microwave crystal detector 17 which may be, for example, of the silicon-tungsten type. Crystal detectors of this type for microwave frequencies are described in the copending application of Wendell L. Carlson, Serial No. 507,755, filed October 26, 1943. At a point on the receiver waveguide spaced .482 wavelength from the signal crystal detector 17, intermediate the detector and the T-R box 7, is located a tuned aperture device 19, the tuning of which may be adjusted by means of a micrometer mechanism 21. The tuned T-R box 7 and the tuned aperture device 19 comprise a two stub tuner for the signal detector 17.

At another point spaced .75 wavelength further along the receiver waveguide 15 from the signal crystal detector 17 is located a second tuned aperture device 23, the tuning of which may be adjusted by means of a second micrometer control 25. A third tunable aperture device 27 having a third micrometer control 29 is spaced approximately one-half wavelength further along the receiver waveguide, thereby forming a tunable cavity for injection of signals from a local oscillator, not shown. In order that the local oscillator cavity 31 may be non-resonant at the oscillator frequency, it includes a pair of vertical conductive stubs 33 parallel to the electric field, which effectively prevent resonance in any mode of the cavity.

The local oscillations may be generated by any type of microwave oscillator capable of providing suitable heterodyne signals having an output frequency higher than the received signal frequency. An appropriate local oscillator may comprise, for example, a tuned or tunable microwave tube, such as the type 723A tube. The output transmission line of this tube may be coupled into the oscillator injection cavity 31 by inserting the tube output line through an insulating bushing 35 opening into the oscillator injection cavity. For the purpose of simplifying the drawings, the oscillator tube is not shown.

At a point three-quarters of a wavelength (in terms of mean signal frequency) further removed along the received waveguide 15 from the third tunable aperture device 27, is located a second microwave crystal detector 37 of the same type as the signal detector 17. The second microwave crystal detector 37 is utilized for deriving automatic-frequency-control potentials for regulating the frequency of the local oscillator signals. The end of the receiver waveguide 15 adjacent to the automatic-frequency-control crystal 37 opens into a second waveguide 39 which includes a tapered microwave attenuating plug 41 providing approximately 6 decibels attenuation to prevent resonance in the second waveguide 39. The waveguide 39 is coupled at the point 43 to a sampling waveguide 45, which extends at an angle of approximately 45° therefrom and is coupled through a relatively small aperture 47 into the transmitter waveguide 1. The attenuation of the transmitted pulses by the coupling aperture 47 is of the order of decibels, thereby providing a signal of proper level for the automatic-frequency-control crystal. The various automatic-frequency-control circuits actuated by the control crystal 37 in response to transmitted pulses and local oscillator output signals do not form a part of the instant invention and are not described in detail herein. However, it should be understood that such control circuits may include circuit components and arrangements well known in the art.

The coupling of the local oscillator signals from the local oscillator injection cavity 31 to the signal detector 17 and to the control detector 37 is separately controlled by means of the adjustable aperture devices 23 and 27, thereby providing a simple and effective means for regulating and controlling the amount of local oscillator energy coupled to both detectors.

Since the local oscillator frequency is selected to be higher than the received signal frequency, the waveguide section, 1.375λ long, between the tunable T-R box 7 and the signal crystal detector 17 provides a high impedance across the signal detector 17 at the oscillator frequency. This high impedance prevents excessive loading of the local oscillator and obviates pulling of the oscillator frequency. However, the tuning of the T-R box 7 and the first aperture device 19—21 provides efficient coupling for received signals from the antenna waveguide 1 to the signal detector 17. The .75λ spacing between detector 17 and low impedance aperture 23 prevents loading of the detector at signal frequency by the local oscillator cavity or circuits beyond.

The output of the signal detector 17 is derived from an output terminal 49 which is connected to the detector through a threaded insulated bushing 51 cooperating with a complementarily threaded outer bushing 53 which supports the detector transversely across the waveguide 15. The output terminal arrangement of the control detector 37 is identical to that illustrated and described with respect to the signal detector 17. The control detector output terminal 55 is connected to any control circuit which regulates the local oscillator frequency in any manner known in the art.

It should be understood that one of the principal advantages of the instant microwave detector system is that received signals are applied separately and selectively to the two crystal detectors and that the local oscillator signals also are applied separately and selectively to both crystals whereby undesirable reaction between input circuits and the local oscillator circuit, and between the two detector circuits, is obviated. Also due to the critical dimensions of the various sections of the receiver waveguide, loading of the local oscillator by means of the signal crystal or the T-R box is effectively prevented. It should be understood that the critical waveguide dimensions described herein for the purpose of illustration may be modified in each instance by adding thereto any desired number of half wavelengths, since such modification of the waveguide dimensions would have no effect other than that of possible reversal of signal phase, or change of bandwidth.

Thus, the invention described comprises an improved method of and means for receiving and transmitting microwave pulse signals wherein the microwave receiver includes a tuned microwave crystal signal detector and a crystal automatic-frequency-control detector separately energized from the input signal source, and separately and selectively coupled to a local oscillator, for providing controlled intermediate frequency signals in a superheterodyne network. Critical dimensions of the waveguide structure coupling the microwave crystals and their tuning networks effectively prevents loading of the local oscillator and provides proper matching of circuit impedances.

I claim as my invention:

1. In a microwave signal receiver including a signal detector, means for connecting to a source of heterodyning signals and a second detector for deriving automatic frequency control potentials, the improvement comprising a waveguide having said heterodyne signal connecting means coupled to a portion thereof intermediate its ends, separate tunable means coupled to said waveguide for coupling said detectors from opposite directions through said waveguide to said heterodyne signal means, means for introducing signals to be received into both ends of said waveguide for separately applying said received signals to said detectors and means for effectively isolating both of said signal introducing means from said heterodyne signal connecting means.

2. In a microwave signal receiver including a signal detector, means for connecting to a source of heterodyning signals and a second detector for deriving automatic frequency control potentials, the improvement comprising a waveguide having said heterodyne signal connecting means coupled to a portion thereof intermediate its ends, separate tunable means coupled to said waveguide for coupling said detectors from opposite directions through said waveguide to said heterodyne signal means, means for introducing signals into both ends of said waveguide for separately applying said signals to said detectors and means for effectively isolating both of said signal introducing means from said heterodyne signal connecting means.

3. In a microwave signal receiver including a signal detector, means for connecting to a source of heterodyning signals and a second detector for deriving automatic frequency control potentials, the improvement comprising a waveguide having said heterodyne signal connecting means coupled to a portion thereof intermediate its ends, separate tunable means coupled to said waveguide for coupling said detectors from opposite directions through said waveguide to said heterodyn signal means, means for selectively introducing transmitted and reecived signals into opposite ends of said waveguide for separately applying said transmitted and received signals to different ones of said detectors, and means for effectively isolating both of said signal introducing means from said heterodyne signal connecting means.

4. A microwave superheterodyne detector network comprising a section of waveguide for input signals, a signal detector coupled to said waveguide, a selectively operable transmit-receive switching device interposed in said waveguide at a point in said waveguide intermediate one end thereof and said detector, tunable aperture means interposed in said waveguide intermediate said switching device and said detector coupling location at a point substantially preventing by-passing of said detector by said input signals and simultaneously substantially matching said detector to said waveguide, a control detector coupled to said waveguide for deriving from said input signals automatic-frequency-control potentials, means disposed intermediate said coupling locations of said detectors for coupling heterodyne signals into said waveguide and to both of said detectors, separate means for controlling said heterodyne signal coupling to each of said detectors, means for introducing said input signals into opposite ends of said waveguide section, and means for controlling the coupling through said waveguide of said introduced signals to each of said detectors.

5. A microwave superheterodyne detector network comprising a section of waveguide for input signals, a signal detector coupled to said waveguide, a selectively operable transmit-receive switching device interposed in said waveguide at a point in said waveguide intermediate one end thereof and said detector, tunable aperture means interposed in said waveguide intermediate said switching device and said detector coupling location at a point substantially preventing by-passing of said detector by said input signals and simultaneously substantially matching said detector impedance to said waveguide, a control detector coupled to said waveguide for deriving from said input signals automatic-frequency-control potentials, means disposed intermediate said coupling locations of said detectors for coupling heterodyne signals into said waveguide and to both of said detectors, separate means for controlling said heterodyne signal coupling to each of said detectors, means for introducing signals to be received into opposite ends of said waveguide section, and means for controlling the coupling through said waveguide of said received signals to each of said detectors.

6. A microwave superheterodyne detector network comprising a section of waveguide for input signals, a signal detector coupled to said waveguide, a selectively operable transmit-receive switching device interposed in said waveguide at a point in said waveguide intermediate one end thereof and said detector, tunable aperture means interposed in said waveguide intermediate said switching device and said detector coupling location at a point substantially preventing by-passing of said detector by said input signals and simultaneously substantially matching said detector impedance to said waveguide, a control detector coupled to said waveguide for deriving from said input signals automatic-frequency-control potentials, means disposed intermediate said coupling locations of said detectors for coupling heterodyne signals into said waveguide and to both of said detectors, separate means for controlling said heterodyne signal coupling to each of said detectors, means for introducing transmitted and received signals into opposite ends of said waveguide section for separately coupling said transmitted and received signals to different ones of said detectors, and means for controlling said coupling through said waveguide of said introduced signals to each of said detectors.

7. A microwave superheterodyne detector network comprising a section of waveguide for input signals, a signal detector coupled to said waveguide at a point intermediate the ends of said waveguide, a selectively operable transmit-receive switching device interposed in said waveguide at a point spaced a distance of substantially one and three-eighths wavelengths at the operating microwave frequency from said coupling point of said detector, tunable aperture means interposed in said waveguide intermediate said switching device and said coupling point of said detector at a point spaced substantially one-half wavelength from said detector coupling point for substantially preventing by-passing of said detector by said input signals and for simultaneously substantially matching said detector to said waveguide, a control detector coupled to said waveguide for deriving from said signals automatic-frequency-control potentials, means disposed intermediate said coupling points of said detectors substantially equidistant therefrom for coupling heterodyne signals into said waveguide and to both of said detectors, separate means for controlling said heterodyne signal coupling to each of said detectors, means for introducing input signals into opposite ends of said waveguide section, and means for controlling the coupling through said waveguide of said introduced signals to each of said detectors.

8. A microwave superheterodyne detector network comprising a section of waveguide for input signals, a signal detector coupled to said waveguide at a point intermediate the ends of said waveguide, a selectively operable transmit-receive switching device interposed in said waveguide at a point spaced a distance of substantially one and three-eighths wavelengths at the operating microwave frequency from said coupling point of said detector, tunable aperture means interposed in said waveguide intermediate said switching device and said coupling point of said detector at a point spaced substantially .48 wavelength from said detector coupling point for substantially preventing by-passing of said detector by said input signals and for simultaneously substantially matching said detector to said waveguide, a control detector coupled to said waveguide for deriving from said signals automatic-frequency-control potentials, means disposed intermediate said coupling points of said detectors substantially equidistant therefrom for coupling heterodyne signals into said waveguide and to both of said detectors, separate tunable aperture means for controlling said heterodyne signal coupling to each of said detectors, separate means for introducing input signals into opposite ends of said waveguide section, and means for controlling the coupling through said waveguide of said introduced signals to each of said detectors.

9. Apparatus according to claim 8 including a microwave attenuator interposed in said waveguide between said coupling point of said control detector and said input signal introducing means for preventing reaction from said control detector.

10. Apparatus according to claim 8 wherein said heterodyne signal coupling means comprises an input line coupled into the waveguide cavity between said separate tunable aperture means, and a pair of conductive elements extending through said cavity for preventing resonance therein to the heterodyne signals.

11. A microwave superheterodyne detector network comprising a section of waveguide for input signals, a signal detector coupled to said waveguide at a point intermediate the ends of said waveguide, a selectively operable transmit-receive switching device interposed in said waveguide at a point spaced substantially one and three-eighths wavelengths at the operating microwave frequency from said coupling point of said detector, tunable aperture means interposed in said waveguide intermediate said switching device and said coupling point of said detector at a point spaced substantially .48 wavelength from said detector coupling point for substantially preventing by-passing of said detector by said input signals and for simultaneously substantially matching said detector to said waveguide, a control detector coupled to said waveguide for deriving from said signals automatic-frequency-control potentials, means disposed intermediate said coupling points of said detectors and spaced substantially equidistant therefrom for coupling heterodyne signals into said waveguide and to both of said detectors, separate tunable aperture means for controlling said heterodyne signal coupling to each of said detectors, said apertures being spaced substantially an odd number of quarter wavelengths from said detectors for substantially preventing loading of said detectors by said heterodyne signal coupling means for introducing input signals into opposite ends of said waveguide section, and means for controlling the coupling through said waveguide of said introduced signals to each of said detectors.

12. A microwave superheterodyne detector network comprising a section of waveguide for input signals, a signal detector coupled to said waveguide at a point intermediate the ends of said waveguide, a selectively operable transmit-receive switching device interposed in said waveguide at a point spaced substantially $$\left[\frac{2n+1}{4}+\frac{1}{8}\right] \text{ wavelengths}$$

where $n$ is an integral number of quarter wavelengths at the operating microwave frequency from said coupling point of said detector, tunable aperture means interposed in said waveguide intermediate said switching device and said coupling point of said detector at a point spaced substantially an integral number of half wavelengths from said detector coupling point for substantially preventing by-passing of said detector by said input signals and for simultaneously substantially matching said detector to said waveguide, a control detector coupled to said waveguide at a point spaced an odd number of half wavelengths from said signal detector for deriving from said signals automatic-frequency-control potentials, means disposed intermediate said coupling points of said detectors and spaced substantially equidistant therefrom for coupling heterodyne signals into said waveguide and to both of said detectors, separate tunable aperture means for controlling said heterodyne signal coupling to each of said detectors, means for introducing input signals into opposite ends of said waveguide section, and means for controlling the coupling through said wave guide of said introduced signals to each of said detectors.

13. Apparatus according to claim 8 wherein one of said input signal introducing means introduces a transverse electric field component of said input signals into the end of said waveguide adjacent to said control detector.

14. In a microwave signal receiver including a signal detector, means for connecting to a source of heterodyning signals and a second detector for deriving automatic frequency control potentials, the improvement comprising a waveguide having said heterodyne signal connecting means coupled to a portion thereof intermediate its ends, separate means coupled to said waveguide for coupling said detectors from opposite directions through said waveguide to said heterodyne signal means, means for introducing signals to be received into both ends of said waveguide for separately applying said received signals to said detectors and means for effectively isolating both of said signal introducing means from said heterodyne signal connecting means.

THOMAS M. GLUYAS, JR.

REFERENCES CITED

The following references are of record in the file of this patent:

UNITED STATES PATENTS

| Number | Name | Date |
|---|---|---|
| 2,253,589 | Southworth | Aug. 26, 1941 |
| 2,304,377 | Roberts | Dec. 8, 1942 |
| 2,404,568 | Dow | July 23, 1946 |

FOREIGN PATENTS

| Number | Country | Date |
|---|---|---|
| 116,110 | Australia | Oct. 4, 1941 |